United States Patent [19]
Wallace

[11] 4,434,996
[45] Mar. 6, 1984

[54] TOWING HITCH CONSTRUCTION

[76] Inventor: Dean L. Wallace, 2899 Chaucer Dr., NE., North Canton, Stark County, Ohio 44721

[21] Appl. No.: 371,240

[22] Filed: Apr. 23, 1982

[51] Int. Cl.³ .......................... B60D 1/04; B60D 1/06
[52] U.S. Cl. .................................................. 280/504
[58] Field of Search ............... 280/504, 506, 512, 507, 280/511

[56] References Cited

U.S. PATENT DOCUMENTS

| | | | |
|---|---|---|---|
| 1,098,281 | 5/1914 | Mayer | 280/504 |
| 1,411,230 | 3/1922 | Weber | 280/504 |
| 1,824,843 | 9/1931 | Staley | 280/504 |
| 2,332,155 | 10/1943 | Lobelle et al. | 280/504 |
| 2,426,532 | 8/1947 | Tierney | 280/33.15 |
| 2,431,694 | 12/1947 | Johnson | 280/504 |
| 2,591,487 | 4/1952 | Wirz | 280/504 |
| 2,766,995 | 10/1956 | Weiss | 280/504 |
| 2,842,380 | 5/1958 | Weiss | 280/504 |
| 3,475,037 | 10/1969 | Weiss | 280/504 |
| 3,522,958 | 4/1970 | Lusignan | 280/507 |
| 3,963,266 | 6/1976 | Thelin | 280/504 |
| 4,208,065 | 6/1980 | Hansen | 280/507 |

Primary Examiner—John A. Pekar
Assistant Examiner—D. Lynn Fugate
Attorney, Agent, or Firm—Oldham, Oldham, Hudak, Weber & Sand Co.

[57] ABSTRACT

A hitch for mounting on the back of a vehicle for towing a trailer or other equipment. A ball is mounted on the extended end of a hook portion of the main hitch body and is adapted to receive either a lunette or hooded-type coupler thereon. A closure latch is pivotally mounted on a rear portion of the hitch body and is engageable with the ball when securing a lunette coupler on the hitch and is alternately engageable with the hood of a hooded coupler when securing such a coupler on the ball. A spring-biased first locking pawl is pivotally mounted on the closure latch and is clamped against a shoulder on the hitch body by a spring to lock the latch in closed position with a hooded coupler. A second locking pawl is pivotally mounted on the first locking pawl and is clamped against the shoulder by the spring to lock the closure latch in engaged position with the hitch ball when securing a lunette coupler thereon. Both locking pawls can be disengaged from the shoulder to permit the closure latch to be moved to an open position for coupling and uncoupling either type of coupler with the ball.

8 Claims, 8 Drawing Figures

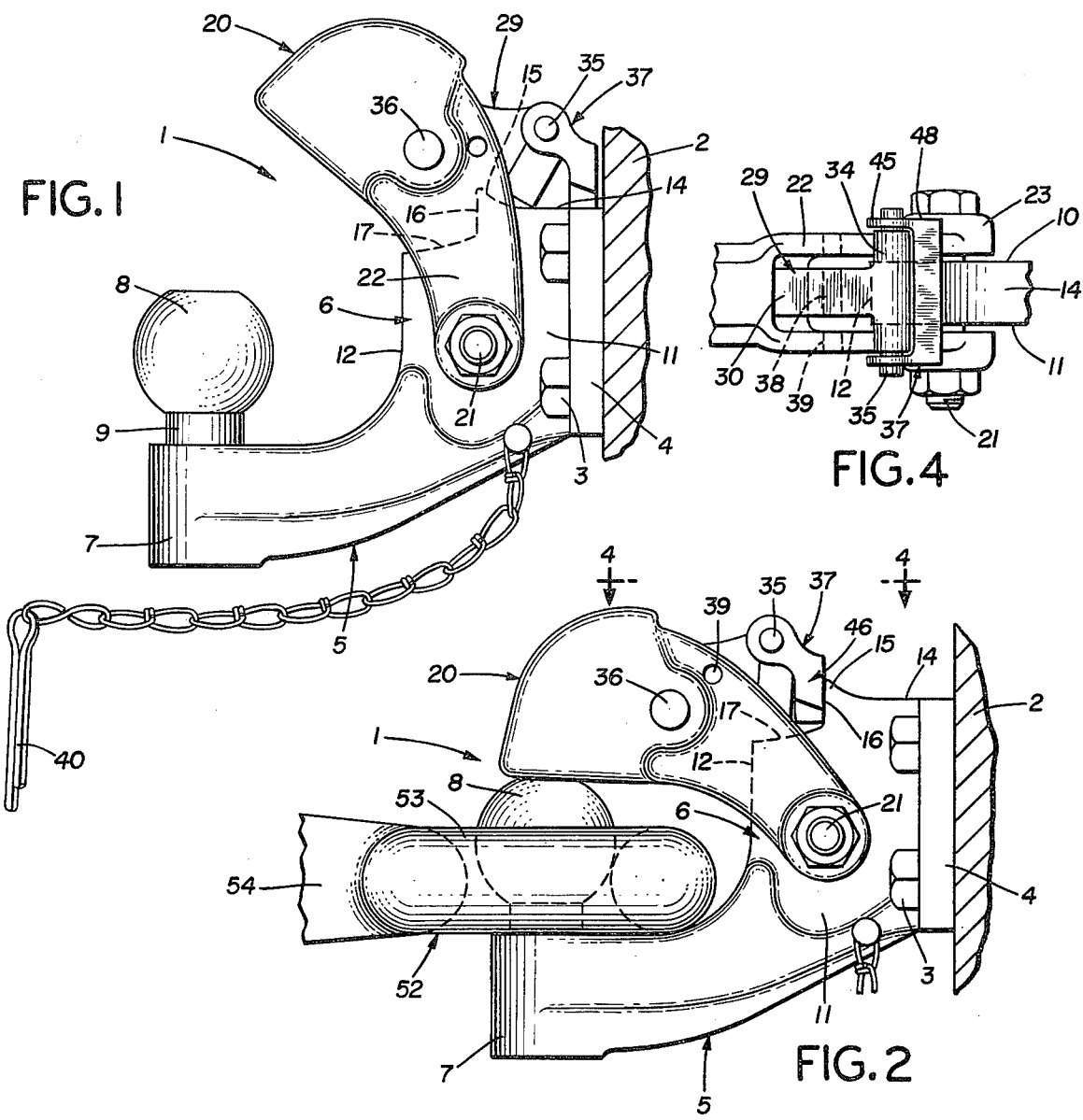
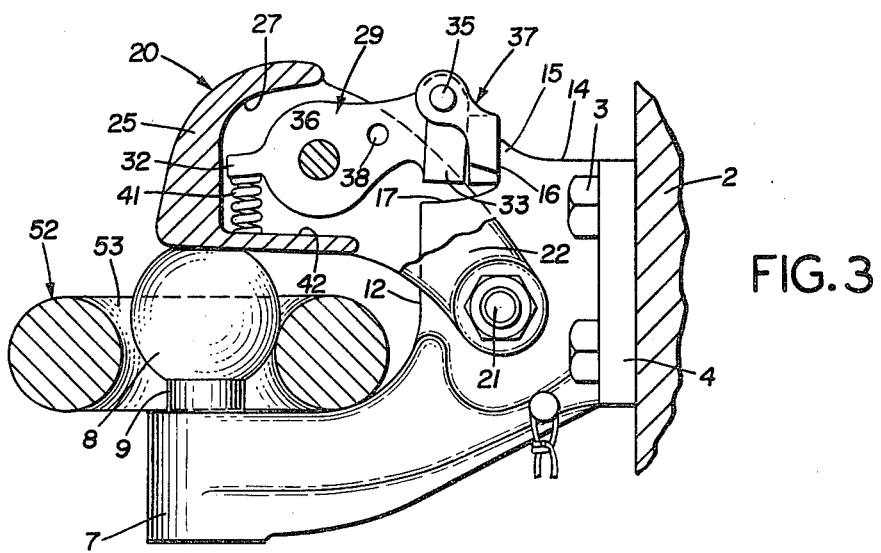

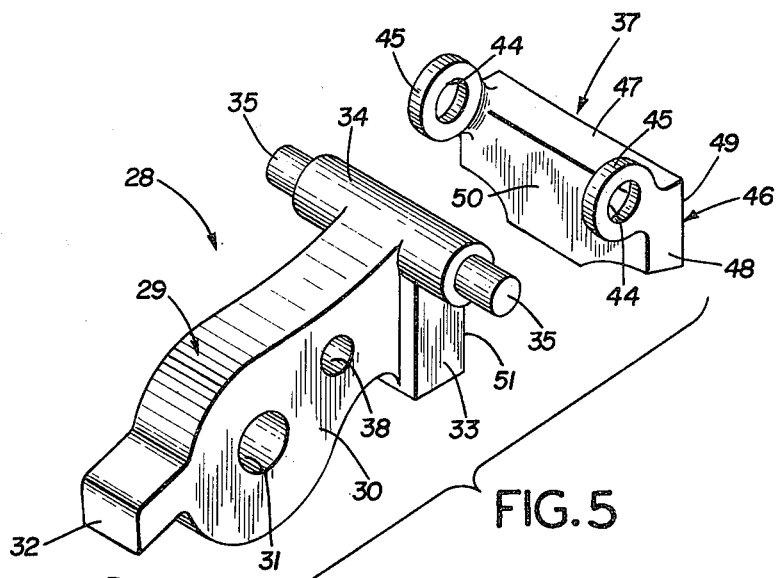
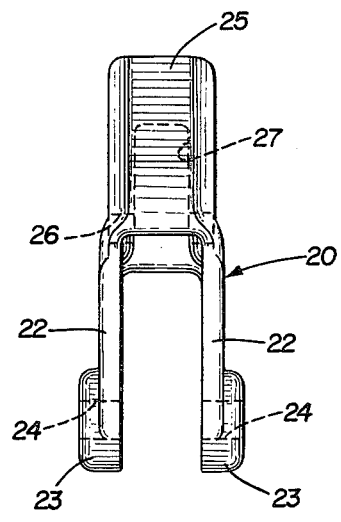
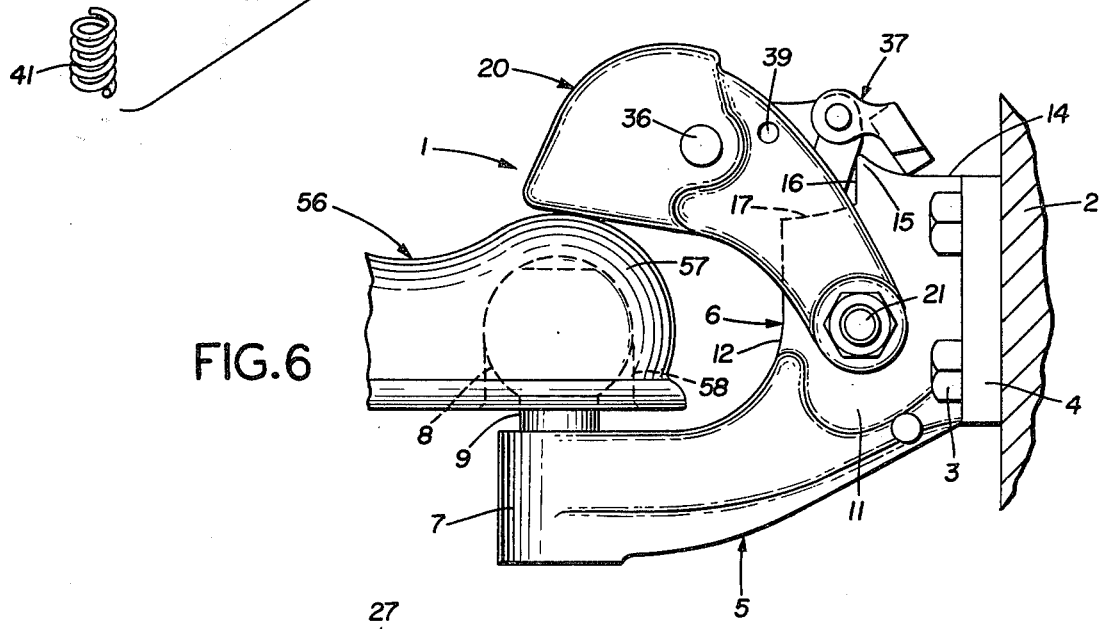
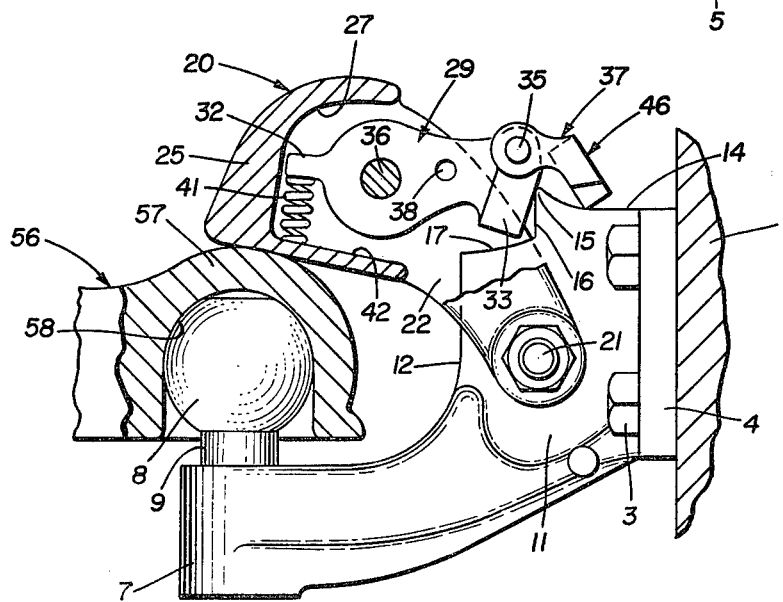

TOWING HITCH CONSTRUCTION

BACKGROUND OF THE INVENTION

1. Field of the Invention

The invention relates to hitches adapted to be mounted on the backs of vehicles for towing trailers or other types of equipment. More particularly, the invention relates to a hitch having a closure latch which has positive locking means to lock the latch in a first position when securing a hooded coupler on a ball hitch and to lock the latch in a second position when securing a lunette coupler on the ball.

2. Description of the Prior Art

Numerous types of hitches have been devised which are mounted on the back of a power-driven vehicle for coupling engagement with the drawbar of a piece of equipment, such as a trailer or the like, which is towed by the power-driven vehicle. Many of these hitches are provided with locking means to secure a closure latch in a locked position on the particular type of coupler that is mounted on the end of a drawbar of the towed vehicle to prevent the latch from becoming disengaged from the coupler during towing of the vehicle. Still other types of hitches are provided with locking means which lock the closure latch in the coupled latched position, and which also will secure the latch in in open position to facilitate the coupling of the hitch on the towing vehicle with the vehicle being towed. Still other hitches are provided with means for automatically releasing the coupling or closure latch. Some examples of these prior art latches are shown in U.S. Pat. Nos. 1,098,281, 1,411,230, 1,824,843, 2,332,155, 2,426,532, 2,591,487, 2,766,995, 2,842,380 and 3,475,037.

There are various types of hitch constructions that are used today since there are various types of couplers which are attached to the ends of the drawbars of the towed vehicles. However, there are two main types of drawbar couplers used by the majority of towed vehicles. One type is lunette, which is a strong metal circular ring welded to the end of a drawbar. The ring is placed over a ball hitch mounted on an end of a hook-shaped projection of the hitch. A closure latch on the hitch is pivotally moved into engagement with the top of a ball and traps the lunette thereon. The closure latch will have locking means to prevent the latch from moving upwardly out of its engaged position with the ball hitch.

Another type of coupler is a hooded coupler which has a hollow inverted semispherical-shaped hood mounted on the end of the drawbar. The hood is placed over the top of the ball hitch which partially encloses the ball. The hooded coupler usually will have some type of locking means associated with it which engages the ball to retain the coupler thereon.

There is no known hitch construction of which I am aware which provides a positive locking mechanism for the closure latch of the hitch which securely locks both types of couplers, the lunette and hooded coupler, in coupled position on a ball hitch. U.S. Pat. No. 3,963,266 shows a coupler which locks the closure latch in a position when a lunette coupler is mounted over the ball hitch and which alternately secures the closure latch in an open position to permit the hooded type of coupler to be used with the ball hitch. However, the hooded coupler of this patent relies on its own locking means for retaining the coupler engaged with the ball hitch.

SUMMARY OF THE INVENTION

Objectives of the invention include providing an improved hitch construction for mounting on the back of a power-driven vehicle for towing a trailer or other types of equipment, in which the hitch has a pivotally mounted closure latch mounted on one end that is engageable with a ball hitch mounted on a hook formed on the other end of the hitch body, and in which the latch is provided with positive locking means to lock the closure latch in a first closed position engaged with the hood of a hooded type coupler mounted over the ball hitch and in a second closed position engaged with the top of the ball for securing a lunette type of coupler thereon.

Another objective is to provide such a hitch in which the locking means is pivotally mounted on the closure latch and is moved manually between the pair of locking positions and can be pivotally moved out of either position to permit the closure latch to be moved to a fully open position for coupling and uncoupling either type of coupler from the ball hitch. Still another objective is to provide such a hitch in which the components can be formed of extremely rugged cast or forged metal members, which will withstand the harsh environment and rugged abuse which they will encounter when mounted on the back of a vehicle and during engagement and towing of a trailer or other equipment, and in which the hitch has a minimum number of movable parts, thereby reducing repair and maintenance problems and facilitating the assembly and manufacture of the improved hitch.

A still further objective is to provide such a hitch construction which eliminates difficulties encountered with prior hitches, which achieves the objectives indicated, and which solves problems and satisfies needs existing in the art.

These objectives and advantages are obtained by the improved hitch construction, the general nature of which may be stated as including a body having a mounting end and an outwardly projecting hook; a ball mounted on an extended end of the hook and projecting upwardly therefrom; a closure latch pivotally mounted on the mounting end of the body spaced from the ball; and lock means movably mounted on the closure latch and engageable with the mounting end of the body for locking the latch in a first closed position spaced above the ball a distance sufficient to engage a hood of hooded-type coupler when mounted on the ball to prevent disengagement of the hood from the ball, and alternately for locking the latch in a second closed position against the ball to prevent disengagement of a lunette coupler from the ball.

BRIEF DESCRIPTION OF THE DRAWINGS

A preferred embodiment of the invention, illustrative of the best mode in which applicant has contemplated applying the principles, is set forth in the following description and shown in the drawings, and is particularly and distinctly pointed out and set forth in the appended claims.

FIG. 1 is a side elevational view of the improved trailer hitch construction shown mounted on a portion of a vehicle with the closure latch being in fully open position;

FIG. 2 is a view similar to FIG. 1 showing the closure latch in closed position engaged with the latch ball securing a lunette therein;

FIG. 3 is a view similar to FIG. 2 with portions of the closure latch and lunette shown in section;

FIG. 4 is a fragmentary top plan view looking in the direction of arrows 4—4, FIG. 2;

FIG. 5 is an exploded perspective view of the improved locking mechanism of the closure latch;

FIG. 6 is a view similar to FIG. 2 showing the closure latch in locked position engaged with the hood of an alternate type of coupler;

FIG. 7 is a view similar to FIG. 6 with portions of the closure latch and coupler hood shown in section; and FIG. 8 is a top plan view of the closure latch component of the improved hitch.

Similar numerals refer to similar parts throughout the drawings.

DESCRIPTION OF THE PREFERRED EMBODIMENT

The improved hitch construction is indicated generally at 1, and is shown in FIG. 1 mounted on a frame 2 of a vehicle by a plurality of bolts 3. Bolts 3 extend through openings formed in a mounting plate portion 4 of a main hitch body, indicated generally at 5. Body 5 includes a mounting end portion, indicated generally at 6, and an outwardly projecting hook 7. A ball 8 is mounted on the extended end of hook 7 and projects upwardly therefrom. Ball 8 preferably is mounted on hook 7 by a shaft 9, the lower end of which is threadably engaged within a hole formed in the end of hook 7 so as to be replaceable in the event it becomes damaged.

Main hitch body 5 is formed of an extremely strong and rigid metal, preferably by a forging operation, with projecting hook 7 and mounting end 6 being integral with each other. Mounting end 6 includes a pair of vertically spaced side surfaces 10 and 11 which terminate in a vertically extending front surface 12. The upper portion of mounting end 6 has a horizontally extending top surface 14 formed with an upwardly extending projection 15. Projection 15 has a vertically extending front surface 16 which provides a locking shoulder for the improved locking mechanism of the invention. Surface 16 terminates in a generally horizontal surface 17 which extends between vertical end surface 12 and projection surface 16.

A closure latch, indicated generally at 20 (FIG. 8), is pivotally mounted on mounting end 6 of body 5 by a bolt 21. Bolt 21 extends through a horizontal hole formed in a mounting end 6 of hitch body 5. Closure latch 20 includes a pair of spaced legs 22 between which mounting end 6 is inserted for pivotally mounting latch 20 thereon. Legs 22 include bosses 23 in which holes 24 are formed for receiving pivot bolt 21 therethrough. Closure latch 20 has a thickened outer end portion 25 (FIG. 3) and a hollow interior 27. A hole 26 is formed in latch 20 and extends transversely through hollow interior 27 for pivotally mounting therein the improved locking means, indicated generally at 28 (FIG. 5).

Locking means 28 includes a first locking pawl 29 which is pivotally mounted within hollow interior 27 of the outer end of closure latch 20 (FIGS. 3 and 5) by a pin 36 which extends through hole 26. Locking pawl 29 includes a lever portion 30 having a hole 31 which aligns with hole 26 for receiving pivot pin 36. Lever 30 terminates at its front end in an outwardly extending tab 32 and at the other end in a rectangular-shaped lug 33. Lug 33 is formed integrally with a cylindrical member 34 which terminates in a pair of reduced-diameter end portions 35 which form a pivot pin for a second locking pawl, indicated generally at 37 (FIG. 4). A smaller hole 38 also may be formed in and extend transversely through lever portion 30 of locking pawl 29 which aligns with a complementary-shaped hole 39 formed in spaced legs 22 of closure latch 20 for receiving a cotter pin 40 to provide an additional safety lock when closure latch 20 is in either the first or second latch locking positions, as shown in FIGS. 7 and 3, respectively. A compression coil spring 41 is mounted within hollow interior 27 of closure latch end 25 and biases locking pawl 29 in a clockwise direction, as shown in FIGS. 3 and 6, toward the latch locking positions. Coil spring 41 extends between tab 32 of lever 30 and bottom wall 42 of latch 20.

In accordance with one of the main features of the invention, second locking pawl 37 is pivotally mounted on pivot pin ends 35 which extend through aligned holes 44 formed in a pair of outwardly extending ears 45 (FIG. 5) formed on pawl 37. Pawl 37 further includes a somewhat rectangular-shaped locking lug 46 having a top surface 47, a pair of end surfaces 48, a rear surface 49 and a front surface 50. Pawl 37 preferably is formed as an integral, one-piece metal forging.

The operation of hitch construction 1, showing the improved features and advantages thereof, is shown particularly in FIGS. 2, 3, 6 and 7. Hitch 1 is shown in FIGS. 2 and 3 in locked position securing a lunette-type coupler, indicated generally at 52, in coupled engagement with hitch 1. Lunette 52 includes a ring 53 which is welded to a drawbar 54 which in turn is connected to a towed vehicle or other piece of equipment. When in closed position, latch 20 is in abutting engagement with the top of ball 8 to trap lunette 52 on ball 8. Latch 20 is locked in the latched position of FIGS. 2 and 3 by pivotally moving locking means 28 in an upward counterclockwise direction about pin 36 by lifting upwardly on ends 35 of cylindrical member 34. This counterclockwise movement compresses coil spring 41 enabling second locking pawl 37 to be pivoted in a clockwise direction after which lug 46 is inserted between lug 33 of first locking pawl 29 and projection 15 of mounting end 6. Surfaces 49 and 50 of lug 46 are in clamped abutting engagement between surface 16 of projection 15 and rear surface 51 of locking lug 33. Spring 41 provides the biasing or clamping force to secure lug 46 in this locked position. Cotter pin 40 then may be inserted through aligned holes 39 and 38 to completely ensure that closure latch 20 remains in locked position against the top of ball 8. This arrangement provides positive locking of closure latch 20 preventing any upward or clockwise movement of closure latch 20 until cotter pin 40 is removed and locking pawl 37 is manually removed from its engagement with projection 15 by the upward movement of pawl 37 by grasping cylindrical member ends 35.

In accordance with another feature of the invention, the double locking pawl arrangement of pawls 29 and 37 enables closure latch 20 to be secured in a positive locked position to secure a hooded-type coupler, indicated generally at 56, on ball 8, as shown in FIGS. 6 and 7. Coupler 56 is a usual type hooded coupler found on certain vehicles consisting of a hollow, inverted semispherical member 57 having a hollow interior 58 into which ball 8 is seated when hooded coupler 56 is mounted thereon. Hooded coupler 56 may have other locking means incorporated into the coupler which assists in clamping or locking the coupler to ball 8.

Improved hitch 1 provides a positive locking mechanism for locking closure latch 20 in engaged position with hood 57 to prevent premature removal or release of hooded coupler 56 from ball 8. This locking feature is achieved by pivoting closure latch 20 into engaged position with hood 57 (FIG. 6) and pivotally moving lug 33 of locking pawl 29 in a clockwise direction into engagement with projection 15, as shown in FIG. 7. The biasing force of spring 41 against lever tab 32 secures lug 33 in a clamping engagement with surface 16 of projection 15, preventing any further upward movement of closure latch 20. Again, if desired, cotter pin 40 may be inserted through aligned holes 39 and 38 to further ensure a positive locking engagement of latch 20 with hooded coupler 56.

In this first latch locking position, second locking pawl 37 will be free of any active engagement with the hitch body and will merely rest against top surface 14, as shown in FIGS. 6 and 7. Removal of locking lug 33 from engagement with projection 15 by an upward counterclockwise pivotal movement of cylindrical end members 35 which compresses springs 41, enables closure latch 20 to be pivoted in a clockwise direction about bolt 21 to the fully open position of FIG. 1. In this open position, either hooded coupler 56 or lunette coupler 52 may be engaged with ball 8 or removed therefrom.

There is no known hitch construction of which I am aware that provides a two-position positive locking mechanism, as provided by locking pawls 29 and 37, which positively locks either a lunette coupler or hooded coupler on ball 8, as shown in the drawings and described above.

Accordingly, the construction is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the towing hitch is constructed and used, the characteristics of the construction and the advantageous, new and useful results obtained, the new and useful structures, devices, elements, arrangements, parts and combinations are set forth in the appended claims.

I claim:

1. A hitch construction including:
   (a) a body having a mounting end an an outwardly projecting hook;
   (b) a ball mounted on an extended end of the hook and projecting upwardly therefrom;
   (c) a closure latch pivotally mounted on the mounting end of the body spaced from the ball; and
   (d) lock means movably mounted on the closure latch and engageable with the mounting end of the body for locking the latch in a first closed position spaced above the ball a distance sufficient to engage a hood of a hooded-type coupler when mounted on the ball to prevent disengagement of the hood from the ball, and alternately for locking the latch in a second closed position against the ball to prevent disengagement of a lunette coupler from the ball, said lock means including first and second locking pawls alternately engageable with a projection formed on the body to lock the closure latch in the first and second closed positions, respectively.

2. The hitch construction defined in claim 1 in which the first locking pawl is pivotally mounted on the closure latch and the second locking pawl is pivotally mounted on the first locking pawl.

3. The hitch construction defined in claim 1 in which a spring is operatively engaged with the first locking pawl and biases the first and second locking pawls toward their respective locking position with the body projection when the closure latch is engaged with a respective coupler.

4. The hitch construction defined in claim 1 in which the body projection has a generally vertical extending surface; and in which the first locking pawl has a rear surface which is placed in abutting clamping engagement against the projection surface when in locked position.

5. The hitch construction defined in claim 4 in which the second locking pawl has a lug formed on an extended end of the pawl; and in which said lug is clamped between the projection surface of the body and the rear surface of the first locking pawl when in locking position.

6. The hitch construction defined in claim 3 in which the closure latch is formed with a hollow interior; in which the first locking pawl is pivotally mounted within the latch interior; and in which the first locking pawl has an outwardly projecting tab which is engaged by the spring for biasing said first locking pawl in a locking direction.

7. The hitch construction defined in claim 2 in which the first locking pawl has a pivot pin formed integrally on the rear of said locking pawl; in which the second locking pawl is formed with a pair of spaced ears; and in which said pivot pin is telescopically mounted within the spaced ears to pivotally mount the second locking pawl on said first locking pawl.

8. The hitch construction defined in claim 1 in which a cotter pin is engageable with the closure latch and the respective locking pawl which is in engagement with the body projection to prevent premature disengagement of said locking pawl from the body projection.

* * * * *